(12) United States Patent
Anderson et al.

(10) Patent No.: US 12,544,081 B2
(45) Date of Patent: Feb. 10, 2026

(54) SURGICAL REAMER AND METHOD OF REAMING A BONE

(71) Applicant: DEPUY IRELAND UNLIMITED COMPANY, County Cork (IE)

(72) Inventors: James Anderson, Leeds (GB); Timothy Board, Bury (GB)

(73) Assignee: DEPUY IRELAND UNLIMITED COMPANY, Ringaskiddy (IE)

( * ) Notice: Subject to any disclaimer, the term of this patent is extended or adjusted under 35 U.S.C. 154(b) by 428 days.

(21) Appl. No.: 17/996,843

(22) PCT Filed: Apr. 13, 2021

(86) PCT No.: PCT/EP2021/059521
§ 371 (c)(1),
(2) Date: Oct. 21, 2022

(87) PCT Pub. No.: WO2021/213841
PCT Pub. Date: Oct. 28, 2021

(65) Prior Publication Data
US 2023/0157706 A1  May 25, 2023

(51) Int. Cl.
*A61B 17/16* (2006.01)

(52) U.S. Cl.
CPC ........ *A61B 17/1617* (2013.01); *A61B 17/164* (2013.01); *A61B 17/1668* (2013.01)

(58) Field of Classification Search
CPC .............. A61B 17/1617; A61B 17/164; A61B 17/1668; A61B 17/1659

(Continued)

(56) References Cited

U.S. PATENT DOCUMENTS

| 5,342,366 A | * | 8/1994 | Whiteside | A61B 90/06 606/86 R |
| 5,607,431 A | * | 3/1997 | Dudasik | A61F 2/4684 606/86 R |

(Continued)

FOREIGN PATENT DOCUMENTS

| EP | 3248552 A1 | 11/2017 |
| WO | WO 2013120004 A1 | 8/2013 |

OTHER PUBLICATIONS

GB search report, received for GB patent application No. GB2005940.8 mailed on Oct. 7, 2020, 3 Pages.

(Continued)

*Primary Examiner* — Jessica Weiss
(74) *Attorney, Agent, or Firm* — Barnes & Thornburg LLP

(57) ABSTRACT

A surgical reamer and a method of reaming a bone using a surgical reamer. The reamer has a distal part comprising a proximal end coupleable to a surgical rotational driver; a distal end; a rotational axis extending between the proximal end and the distal end; and a cutting surface located between the proximal end and the distal end. The reamer also has a proximal part comprising a proximal end coupleable to a surgical rotational driver; a distal end; a rotational axis extending between the proximal end and the distal end; a cutting surface located between the proximal end and the distal end; and a cavity extending proximally from the distal end for receiving the proximal end of the distal part. An inner surface of the cavity is shaped to allow the proximal part to be tilted with respect to the distal part during rotation of the proximal part.

13 Claims, 5 Drawing Sheets

(58) Field of Classification Search
USPC .................................................. 606/79–80
See application file for complete search history.

(56) References Cited

U.S. PATENT DOCUMENTS

| | | | | |
|---|---|---|---|---|
| 5,643,271 | A * | 7/1997 | Sederholm | A61B 17/175 |
| | | | | 606/80 |
| 5,908,423 | A * | 6/1999 | Kashuba | A61B 17/175 |
| | | | | 408/127 |
| 5,957,925 | A * | 9/1999 | Cook | A61B 17/1668 |
| | | | | 606/87 |
| 6,517,581 | B2 * | 2/2003 | Blamey | A61B 17/1668 |
| | | | | 606/172 |
| 8,357,163 | B2 * | 1/2013 | Sidebotham | A61B 17/1666 |
| | | | | 606/80 |
| 8,758,446 | B2 * | 6/2014 | Smith | A61F 2/3607 |
| | | | | 623/22.42 |
| 2003/0109932 | A1 * | 6/2003 | Keynan | A61F 2/3601 |
| | | | | 623/23.26 |
| 2003/0176868 | A1 * | 9/2003 | Pepper | A61B 17/162 |
| | | | | 606/80 |
| 2004/0153081 | A1 * | 8/2004 | Tulkis | A61B 17/1668 |
| | | | | 606/80 |
| 2015/0173777 | A1 * | 6/2015 | Ferko | A61B 17/17 |
| | | | | 606/80 |

OTHER PUBLICATIONS

International search report and written opinion, received for PCT application No. PCT/EP2021/059521 mailed on Jul. 16, 2021, 17 pages.

* cited by examiner

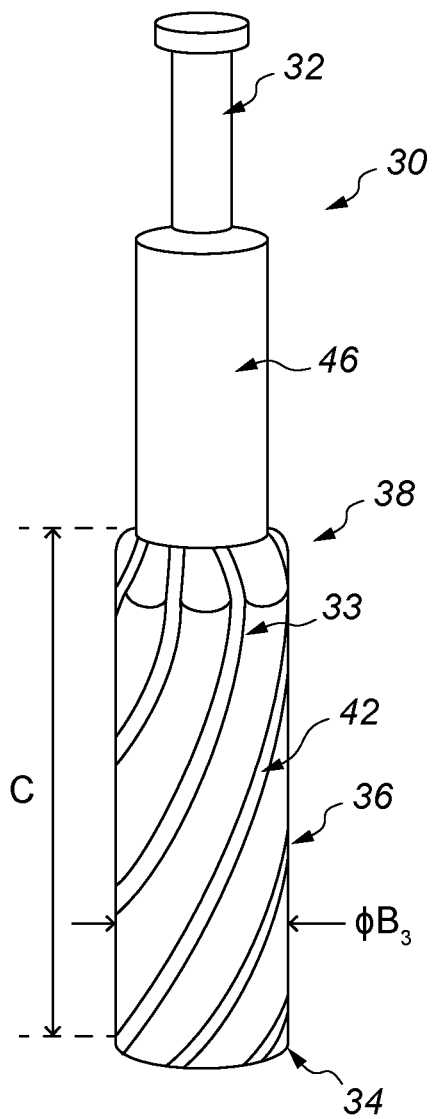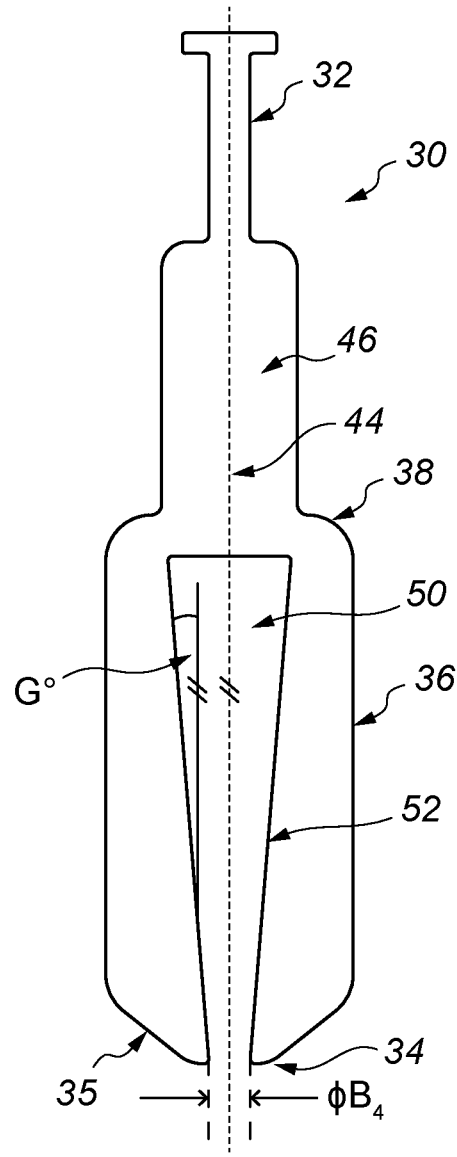
Fig. 4
Fig. 5

SURGICAL REAMER AND METHOD OF REAMING A BONE

CROSS REFERENCE TO RELATED PCT APPLICATION

This application is a National Stage 35 U.S.C. 371 of International Patent Application PCT/EP2021/059521 filed Oct. 28, 2021, which claims priority to United Kingdom Application No. GB2005940.8, filed Apr. 23, 2020, both of which are incorporated by reference in their entireties.

BACKGROUND

The present specification relates to a surgical reamer and to a method of reaming a bone using a surgical reamer.

An Extended Trochanteric Osteotomy is used during hip revision surgery to allow removal of well-fixed stems, bone cement or fractured prostheses. Once the intra-medullary intramedullary canal has been cleared, the trochanter is may be re-attached using a circlage and, in the case of a Wagner-type prosthesis, the intramedullary canal is reamed to allow a new implant to be inserted.

Revision implants can be in the region of 300 mm long and 25 mm in diameter, so it can be challenging to prepare the intramedullary canal without sacrificing the medial wall of the greater trochanter, which is not desirable.

Similar considerations apply to shoulder surgery.

SUMMARY

Aspects of the present disclosure are set out in the accompanying independent and dependent claims. Combinations of features from the dependent claims may be combined with features of the independent claims as appropriate and not merely as explicitly set out in the claims.

According to an aspect of the present disclosure, there is provided a surgical reamer comprising:
  a distal part comprising:
    a proximal end coupleable to a surgical rotational driver for applying torque to the distal part;
    a distal end;
    a rotational axis extending between the proximal end of the distal part and the distal end of the distal part; and
    a cutting surface located between the proximal end of the distal part and the distal end of the distal part; and
  a proximal part comprising:
    a proximal end coupleable to a surgical rotational driver for applying torque to the proximal part;
    a distal end;
    a rotational axis extending between the proximal end of the proximal part and the distal end of the proximal part;
    a cutting surface located between the proximal end of the proximal part and the distal end of the proximal part; and
    a cavity extending proximally from the distal end of the proximal part for receiving the proximal end of the distal part, wherein an inner surface of the cavity is shaped to allow the rotational axis of the proximal part to be tilted with respect to the rotational axis of the distal part during rotation of the proximal part about the rotational axis of the proximal part with the proximal end of the distal part received within said cavity.

A surgical reamer according to embodiments of this disclosure can facilitate a two stage reaming process in which the distal part may be used to ream an interior surface of a bone (e.g. in an intramedullary canal) and then the proximal part can be mounted on the proximal end of the distal part for reaming at or near to an opening into the bone, within which the distal part is received. The mounting of the proximal part on the distal part allows tilting of the proximal part with respect to the distal part, whereby the features of the bone (e.g. the great trochanter) can be reamed laterally. In some embodiments, this can allow the reamed surface to match the shape of an implant to be installed within the bone.

The cavity may be shaped to allow the rotational axis of the proximal part to be tilted in a plurality of directions with respect to the rotational axis of the distal part during rotation of the proximal part about the rotational axis of the proximal part with the proximal end of the distal part received within said cavity. This can add extra flexibility for reaming the bone according to the requirements of the surgical procedure by providing multiple degrees of freedom for the movement of the proximal part.

The cavity may be shaped to allow the rotational axis of the proximal part to be tilted for precession of the rotational axis of the proximal part about the rotational axis of the distal part during rotation of the proximal part about the rotational axis of the proximal part with the proximal end of the distal part received within said cavity. This can add further flexibility for reaming the bone according to the requirements of the surgical procedure.

The cavity may be shaped to allow the rotational axis of the proximal part to be tilted with respect to the rotational axis of the distal part during rotation of the proximal part about the rotational axis of the proximal part with the proximal end of the distal part received within said cavity by an angle $\theta$ in the range $0° \leq \theta \leq 25°$.

The cavity may be frustum shaped. A narrow end of the frustum shaped cavity may be located at the distal end of the proximal part. A wide end of the frustum shaped cavity may be located proximally with respect to the distal end of the proximal part. A cross section of the frustum shaped cavity in a plane perpendicular to the rotational axis of the proximal part may be substantially circular. These features can provide multiple degrees of freedom for the tilting of the proximal part, while also not inhibiting rotation of the proximal part with the proximal end of the distal part received within the cavity.

The proximal end of the distal part may be slideably insertable and removable from the cavity. This can also allow proximal/distal movement of the proximal part during reaming and tilting.

The proximal end of the distal part may have a connection feature for coupling to the surgical rotational driver. The cavity may have a depth equal to or greater than a length of the connection feature. This can allow the connection feature to be completely received within the cavity. The size (length) of the proximal part and the depth of the cavity can be chosen according to the areas of the bone that need to be reached by the cutting surface of the proximal part.

The distal end of the proximal part may have a chamfer to facilitate tilting of the proximal part with respect to the distal part.

A chamfer angle of the chamfer with respect to a plane perpendicular to the rotational axis of the proximal part may be substantially equal to or greater than a maximum value of tilt angle $\theta$ allowed by the shape of the cavity.

The cutting surface of the proximal part may extend between the distal end of the proximal part and a cutting shoulder located intermediate the distal end of the proximal part and the proximal end of the proximal part. The shoulder may aid in retrograde reaming of the greater trochanter. For instance, the shoulder may be shaped to match the profile of a part (e.g. shoulder) of an implant to be installed in the bone in accordance with a surgical procedure.

The proximal end of the proximal part may be narrower than the cutting surface at the cutting shoulder.

The cutting surface of the proximal part may be formed on a distal shaft portion of the proximal part. The distal shaft portion may be tapered to have a wider diameter at a distal end of the distal shaft portion than at a proximal end of the distal shaft portion.

A widest diameter of the cutting surface of the proximal part at the distal end of the proximal part may be substantially equal to a widest diameter of the cutting surface of the distal part. This can provide room for the coupling of the proximal end of the proximal part to a surgical rotational driver.

In some embodiments, the distal part may be elongate for reaming an inner surface of an intramedullary canal of a femur. The proximal part is elongate for reaming an inner surface of a greater trochanter of the femur. In some embodiments, the distal part may be elongate for reaming an inner surface of an intramedullary canal of a humerus. The proximal part is elongate for reaming an inner surface of a greater trochanter of the humerus.

According to another aspect of the present disclosure, there is provided a surgical kit.

According to another aspect of the present disclosure, there is provided a method of reaming a bone using a surgical reamer, the method comprising:

reaming an inner surface of the bone using a distal part of the surgical reamer, wherein the distal part comprises:
  a proximal end coupleable to a surgical rotational driver for applying torque to the distal part;
  a distal end;
  a rotational axis extending between the proximal end of the distal part and the distal end of the distal part; and
  a cutting surface located between the proximal end of the distal part and the distal end of the distal part; and
reaming an inner surface of the bone using a proximal part of the surgical reamer, wherein the proximal part comprises:
  a proximal end coupleable to a surgical rotational driver for applying torque to the proximal part;
  a distal end;
  a rotational axis extending between the proximal end of the proximal part and the distal end of the proximal part;
  a cutting surface located between the proximal end of the proximal part and the distal end of the proximal part; and
  a cavity extending proximally from the distal end of the proximal part for receiving the proximal end of the distal part, wherein an inner surface of the cavity is shaped to allow the rotational axis of the proximal part to be tilted with respect to the rotational axis of the distal part during rotation of the proximal part about the rotational axis of the proximal part with the proximal end of the distal part received within said cavity,
wherein the reaming an inner surface of the bone using the proximal part of the surgical reamer includes tilting the rotational axis of the proximal part with respect to the rotational axis of the distal part during rotation of the proximal part about the rotational axis of the proximal part with the proximal end of the distal part received within said cavity.

A method according to embodiments of this disclosure can provide a two stage reaming process in which the distal part may be used to ream an interior surface of a bone (e.g. in an intramedullary canal) and then the proximal part can be mounted on the proximal end of the distal part for reaming at or near to an opening into the bone, within which the distal part is received. The tilting of the proximal part with respect to the distal part can allow lateral reaming of features of the bone (e.g. the great trochanter). In some embodiments, this can allow the reamed surface to match the shape of an implant to be installed within the bone.

The distal part can remain substantially stationary within the bone during the reaming of the inner surface of the bone using the proximal part.

The method may include:
  coupling a surgical rotational driver to the proximal end of the distal part;
  performing the reaming of the inner surface of the bone using a distal part;
  decoupling the surgical rotational driver from the proximal end of the distal part;
  coupling a surgical rotational driver to the proximal end of the proximal part;
  receiving the proximal end of the distal part within the cavity while the distal part remains within the bone; and
  performing the reaming of the inner surface of the bone using the proximal part.

The method may include tilting the rotational axis of the proximal part in a plurality of directions with respect to the rotational axis of the distal part during rotation of the proximal part about the rotational axis of the proximal part with the proximal end of the distal part received within said cavity.

The method may include manually precessing the rotational axis of the proximal part about the rotational axis of the distal part during rotation of the proximal part about the rotational axis of the proximal part with the proximal end of the distal part received within said cavity.

The method may include reaming the bone using a cutting shoulder of the cutting surface of the proximal part to substantially match a shape of a shoulder part of an implant to be installed in the bone.

The method may include tilting the rotational axis of the proximal part with respect to the rotational axis of the distal part by during rotation of the proximal part about the rotational axis of the proximal part with the proximal end of the distal part received within said cavity an angle $\theta$ in the range $0° \leq \theta \leq 25°$.

The method may include slideably inserting/removing the proximal end of the distal part into/from the cavity.

In some embodiments, the bone may be a femur. Performing the reaming of the inner surface of the bone using the distal part may comprise reaming an inner surface of an intramedullary canal of the femur. Performing the reaming of the inner surface of the bone using the proximal part may comprise reaming an inner surface of a greater trochanter of the femur.

In some embodiments, the bone may be a humerus. Performing the reaming of the inner surface of the bone using the distal part may comprise reaming an inner surface of an intramedullary canal of the humerus. Performing the reaming of the inner surface of the bone using the proximal part may comprise reaming an inner surface of a greater trochanter of the humerus.

BRIEF DESCRIPTION OF THE DRAWINGS

Embodiments of this disclosure will be described hereinafter, by way of example only, with reference to the accompanying drawings in which like reference signs relate to like elements and in which:

FIG. 4 shows a proximal part of a surgical reamer according to an embodiment of this disclosure;

FIG. 5 shows a cross section of the proximal part of the surgical reamer of FIG. 2;

DETAILED DESCRIPTION

Embodiments of this disclosure are described in the following with reference to the accompanying drawings.

The embodiments described below relate to a surgical reamer and method for use in hip surgery. It is envisaged however that a surgical reamer and method according to embodiments of this disclosure may be employed in shoulder surgery.

Figure 1:
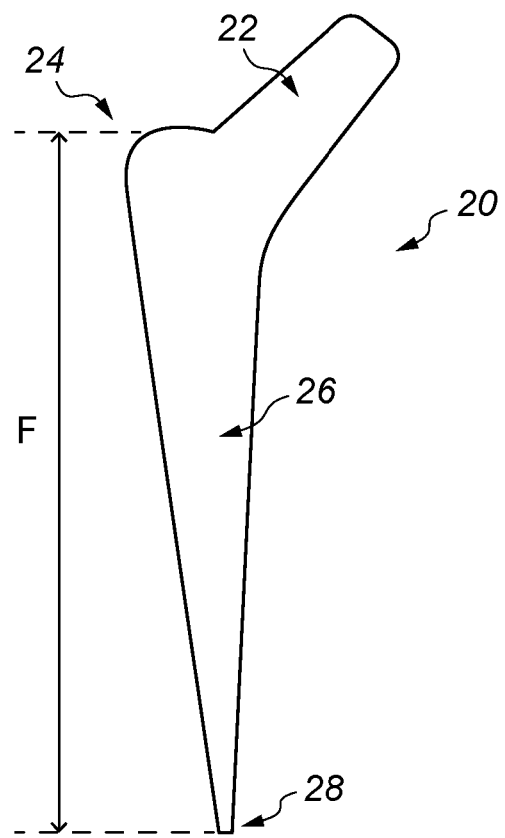
FIG. 1 shows an implant.

FIG. 1 shows an implant 20. The implant 20 is for use in a hip replacement procedure. The implant 20 includes an elongate stem 26, which may taper to a distal tip 28. The stem 26 is shaped to be received within the intramedullary canal of a femur, for example as part of hip revision surgery. The length of the stem 26 is denoted in FIG. 1 as "F". The implant 20 also includes a neck portion 22, which extends at an angle from a proximal end of the stem 26. The implant 20 may also include a shoulder 24 located adjacent a base of the neck portion 22. A proximal end of the neck portion 22 is configured for attachment to a head portion, for insertion in the acetabulum of the patient. The implant 20 may be a trial implant for use the hip revision surgery or may comprise the final implant to be installed in the patient. As noted above, it is envisaged that an embodiments of this disclosure may be employed in shoulder surgery involving an analogous kind of implant.

In order to prepare the femur of the patient for installation of the implant 20, the intramedullary canal must be accessed, and then bone removed from the inside of the canal so that that a suitable cavity is available to receive the stem 26. During hip revision surgery, in which a previous implant is to be replaced with a new stem, a procedure known as Extended Trochanteric Osteotomy may be employed. Extended Trochanteric Osteotomy involves removal of the stem of the previous implant from the intramedullary canal as well as any bone cement. Once the intra-medullary intramedullary canal has been cleared, the trochanter of the femur may be re-attached using a circlage and, in the case of a Wagner-type prosthesis, the intramedullary canal is reamed to remove any further bone that is required to make a suitable cavity for receiving the new implant. Similar considerations may apply in the case of shoulder surgery. Embodiments of this disclosure relate to a surgical reamer and method for performing this task.

Figure 2:
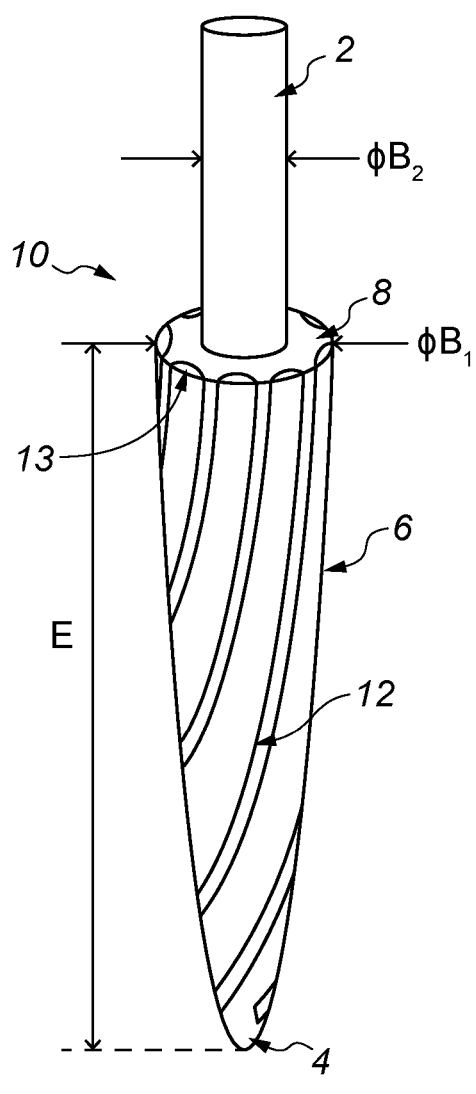
FIG. 2 shows a distal part of a surgical reamer according to an embodiment of this disclosure.
Figure 3:
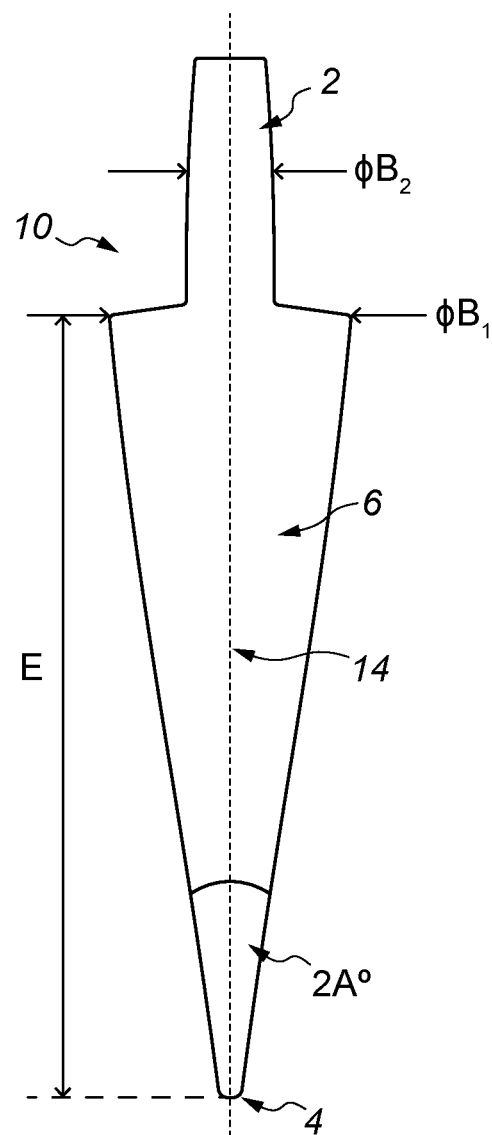
FIG. 3 shows a cross section of the distal part of the surgical reamer of FIG. 2.
Figure 6:
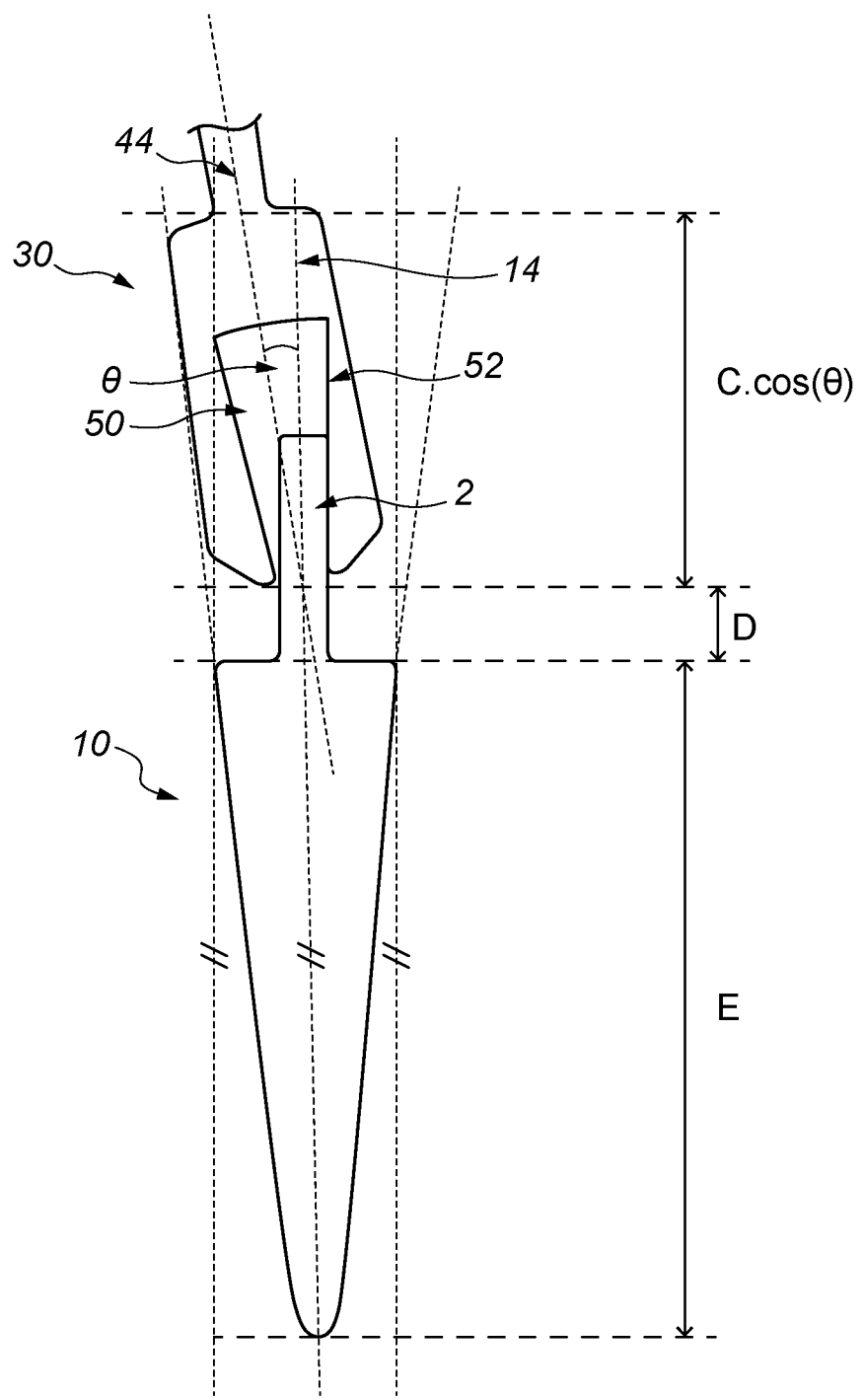
FIG. 6 shows a cross section of an assembled surgical reamer including the distal part of FIGS. 2-3 and the proximal part of FIGS. 4-5 according to an embodiment of this disclosure.
Figure 7:
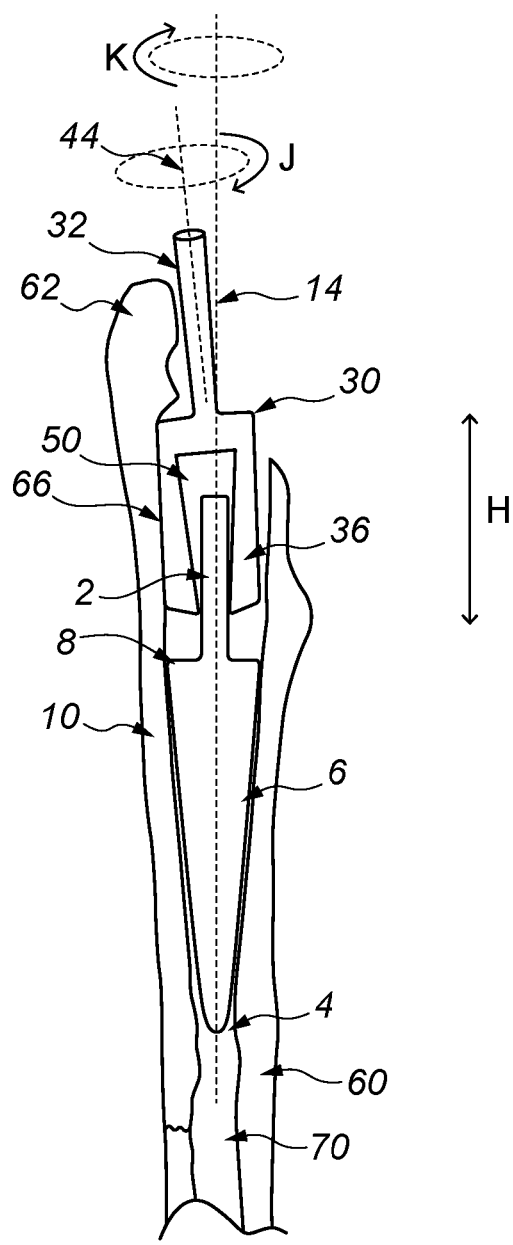
FIG. 7 illustrates a method of reaming a bone using the surgical reamer of FIGS. 2-6 according to an embodiment of this disclosure.

FIGS. 2 to 6 show various views of a surgical reamer according to an embodiment of this disclosure. In particular, FIG. 2 shows a distal part 10 of the surgical reamer, FIG. 3 shows a cross section of the distal part 10, FIG. 4 shows a proximal part 30 of a surgical reamer, FIG. 5 shows a cross section of the proximal part 30 and FIG. 6 shows a cross section of an assembled surgical reamer including the distal part 10 and the proximal part 30 coupled together. FIG. 7 illustrates a method of reaming a femur using the surgical reamer of FIGS. 2-6 according to an embodiment of this disclosure.

The distal part 10 has a proximal end 2. The proximal end 2 is couplable to a surgical rotational driver for applying torque to the distal part 10. The proximal end 2 in this embodiment comprises a substantially cylindrical shaft which may be inserted into the surgical rotational driver for coupling the distal part 10 to the driver. It is envisaged that the proximal end 2 of the distal part 10 may include any suitable connection features for implementing the coupling of the distal part 10 to the driver. As will be described in more detail below, the proximal end 2 may also be used to be couple the distal part 10 to a proximal part 30 of the surgical reamer.

In use, the application of torque to the distal part 10 by the surgical rotational driver may cause rotation of the distal part 10 to allow the distal part 10 to act a drill/reamer for removing bone cement and/or bone from the femur (or humerus in the case of shoulder surgery) as part of an Extended Trochanteric Osteotomy.

The distal part 10 also has a distal end 4. In this embodiment, a tapered shaft 6 extends between the proximal end 2 (e.g. from a distal end of the substantially cylindrical shaft forming the proximal end 2, as shown in FIGS. 2 and 3) and the distal end 4, along a rotational axis 14 of the distal part 10. The tapered shaft 6 tapers inwards toward the distal end 4, such that the distal end forms a tip of the distal part 10. The tapered shaft 6 may have a substantially circular cross section in a plane perpendicular to the rotational axis 14 of the distal part 10.

The distal part 10 further includes a cutting surface 12, which is located between the proximal end 2 and the distal end 4 of the distal part 10. In this embodiment, the cutting surface 12 comprises an outer surface of the tapered shaft 6. The surface of the tapered shaft may include any suitable surface features for implementing the cutting surface 12. In this embodiment, the cutting surface 12 comprises a plurality of substantially helical flutes 13, which extend from a proximal shoulder 8 of the tapered shaft 6 toward the distal end 4.

FIGS. 2 and 3 denote a number of dimensions associated with the distal part 10 in this embodiment. In particular:

ϕ$B_1$ denotes a diameter of the shoulder 8 located at the proximal end of the tapered shaft 6 (i.e. the diameter of the tapered shaft 6 at its widest part);

E denotes a length of the tapered shaft 6 between the shoulder 8 and the distal end 4; and ϕ$B_2$ denotes a diameter of the substantially cylindrical shaft forming the proximal end 2 of the distal part 10 in this embodiment.

Turning now to FIGS. 4 and 5, the proximal part 30 of the surgical reamer has a proximal end 32 and a distal end 34. As with the proximal end 2 of the distal part, the proximal end 32 of the proximal part 30 is couplable to a surgical rotational driver for applying torque to the proximal part 30. The proximal end 32 in this embodiment comprises a substantially cylindrical shaft which may be inserted into the surgical rotational driver for coupling the distal part 10 to the driver. It is envisaged that the proximal end 32 of the proximal part 30 may include any suitable connection features for implementing the coupling of the proximal part 30 to the driver. For instance, in this embodiment, a flange is located at a proximal end of the substantially cylindrical shaft forming the proximal end 32.

In use, the application of torque to the proximal part 30 by the surgical rotational driver may cause rotation of the proximal part 30 to allow the proximal part 30 to act a reamer for removing bone cement and/or bone from the femur (or humerus in the case of shoulder surgery) as part of an Extended Trochanteric Osteotomy. This will be described in more detail below.

The proximal part 30 has a rotational axis 44, which extends between the proximal end 32 and the distal end 34 of the proximal part 30. In this embodiment, a shaft 36/46 extends between the proximal end 32 (e.g. from a distal end of the substantially cylindrical shaft forming the proximal end 32, as shown in FIGS. 4 and 5) and the distal end 34, along the rotational axis 44. The shaft 36/46 may have a substantially circular cross section in a plane perpendicular to the rotational axis 44 of the proximal part 30. The shaft 36/46 in this embodiment includes a distal shaft portion 36 and a proximal shaft portion 46. In some embodiments, the proximal shaft portion 46 may be omitted. The proximal shaft portion 46 may have a substantially smooth outer surface and may be used to provide a working distance between the proximal end 32, which is attached to the driver, and the cutting surface 42 to be described below.

The proximal part 30 further includes a cutting surface 42, which is located between the proximal end 32 and the distal end 34 of the proximal part 30. In this embodiment, the cutting surface 12 is located on an outer surface of the distal shaft portion 36. The surface of the distal shaft portion 36 may include any suitable surface features for implementing the cutting surface 42. In this embodiment, the cutting surface 42 comprises a plurality of substantially helical flutes 33, which extend form a proximal cutting shoulder 38 of the distal shaft portion 36 toward the distal end 34. The proximal shoulder 38 in this embodiment is located at the interface between the proximal shaft portion 46 and the distal shaft portion 36, but may be located adjacent the proximal end 32 in embodiments in which the proximal shaft portion 46 is omitted. The features of the proximal part 30 located proximally with respect to the proximal cutting shoulder 38, including the proximal end and the proximal shaft portion 46 (if any) may all be narrower than the cutting surface 42 at the proximal cutting shoulder 38, so that they do not interfere with the use of the proximal cutting shoulder 38.

The proximal part 30 further includes a cavity 50. The cavity 50 extends proximally from the distal end 34 of the proximal part 30. The cavity is shaped and sized to receive the proximal end 2 of the distal part 10. In particular, an inner surface of the cavity 50 is shaped to allow the rotational axis 44 of the proximal part 30 to be tilted with respect to the rotational axis 14 of the distal part 10 during rotation of the proximal part 30 about the rotational axis 44 of the proximal part 30 with the proximal end 2 of the distal part 10 received within the cavity 50. The depth of the cavity 50 may be chosen such that the proximal end 2 of the distal part 10 may be completely received within the cavity 50.

In this embodiment, the cavity 50 is frustum shaped, although it will be appreciated that this is not essential and that other shapes may allow the aforementioned tilting of the proximal part 30 relative to the distal part 10. A narrow end of the frustum shaped cavity 50 is located at the distal end 34 of the proximal part 30, and a wide end of the frustum shaped cavity 50 is located proximally with respect to the distal end 34 of the proximal part 30. The frustum shaped cavity 50 in this embodiment has a substantially circular cross section in the plane perpendicular to the rotational axis 44. As will be described in more detail below, a cavity 50 having this internal shape can allow the proximal part 30 to be tilted and then processed around the rotational axis 14 of the distal part 10 while the proximal end 2 of the distal part 10 is received within the cavity 50. The taper angle of the frustum shaped cavity 50 may be chosen to determine a maximum tilt angle of the proximal part 30.

FIGS. 4 and 5 denote a number of dimensions and angles associated with the dis proximal part 30 in this embodiment. In particular:

$\phi B_3$ denotes a diameter of the distal shaft portion 36;
  In some embodiments, the diameter of the distal shaft portion 36 of the proximal part 30 may be chosen to approximate or match the diameter of the tapered shaft 6 at its widest part (i.e. $\phi B_3 \approx \phi B_1$);
C denotes a length of the distal shaft portion 36 between the proximal shoulder 38 of the distal shaft portion 36 and the distal end 34;
$\phi B_4$ denotes a diameter of the opening of the cavity 50, which is located at the distal end 34 of the proximal part 30—in some embodiments this diameter may be chosen to match the diameter of the substantially cylindrical shaft forming the proximal end 2 of the distal part 10, plus a tolerance, i.e. $\phi B_4 \approx \phi B_2$; and
G denotes the taper angle between the internal wall 52 of the cavity 50 and the rotational axis 44—note that in this embodiment, the tilt angle θ of the proximal part 30, at which the proximal end 2 abuts the side wall 52 of the cavity 50, is equal to G at maximum tilt (see FIG. 6); in some embodiments, $0° \leq G \leq 25°$ (and hence the maximum value of tilt angle θ is also in the range $0° \leq \theta \leq 25°$.

It is envisaged that in some embodiments, the distal shaft portion 36 may be tapered. In particular, the distal shaft portion 36 may tapered such that it is narrower proximally and wider distally, forming a reverse cone configuration. The combination of the taper angle of the distal shaft portion 36 and the value of G in such embodiments would allow a tapered cavity to be reamed while providing substantial clearance with the trochanter. By way of example only, a 2.5 degree tapered cavity could be reamed by using angle G of 22.5° and a "reverse" taper angle of the distal shaft portion 36 of 20°, giving substantial clearance with the trochanter at the same time.

Turning now to FIG. 6, the coupling between the distal part 10 and the proximal part 30 of the surgical reamer will be described in more detail.

As can be seen in FIG. 6, the proximal part 30 may be coupled to the distal part 10 by inserting the proximal end 2 of the distal part 10 into the cavity 50 of the proximal part 30. The proximal end 2 may be slideably inserted into the cavity 50. With the proximal end 2 received within the cavity 50, the surgeon may manipulate the proximal part to change the tilt angle θ between the proximal part 30 and the distal part 10 (FIG. 6 shows the proximal part 30 tilted by the maximum tilt angle θ=G, such that the proximal end 2 abuts the internal side wall 52 of the cavity 50) and to change the distance D between the distal end 34 of the proximal part 30 and the proximal shoulder 8 of the distal part 10. Note that the vertical "height" of the cutting surface 42 of the distal shaft portion 36 along the rotational axis 14 is given by $C \cdot \cos(\theta) \approx C$ for small tilt angle $\theta$.

These manipulations may be performed while torque is being applied to the proximal part 30 to rotate the proximal part relative to the distal part 10. This can allow the surgeon to use the cutting surface 42 of the proximal part 30 to perform lateral reaming of the femur (or humerus in the case of shoulder surgery) while using the coupling between the proximal end 2 of the distal part 10 and the cavity 50 of the proximal part 30 as a guide. Note that in use there is substantially no torque transfer between the proximal part 30 and the distal 10 and the distal part 10 generally remains stationary during rotation of the proximal part 30 in accordance with embodiments of this disclosure. The provision of a substantially cylindrical proximal end 2 and a frustum shaped cavity 50 can provide a smooth coupling between the distal part 10 and the proximal part 30 to aid against inadvertent torque transfer in practice.

Returning briefly to FIG. 1, in some embodiments, the combined lengths of the distal shaft portion 36 and the tapered shaft 6, plus a typical value for the distance D during the procedure may be chosen to approximate or match the length F of the stem 26 (i.e. $E+C+D \approx F$).

Turning to FIG. 7, a method of reaming a femur 60 using the surgical reamer of FIGS. 2-6 according to an embodiment of this disclosure will now be described. As noted above, it is envisaged that the method may also apply to shoulder surgery in which the humerus is to be reamed.

In an initial step, the distal part 10 may be attached to a surgical rotational driver and then used to perform initial reaming of the femur 60 (or humerus in the case of shoulder surgery). This reaming may include the removal of bone inside the intramedullary canal 70 of the femur 60 (or humerus in the case of shoulder surgery), which generally involves inserting the distal part 10 into the intramedullary canal 60 as shown in FIG. 7, and manipulating the distal part 10 while torque is applied to the distal part 10. In some embodiments, the taper angle of the tapered shaft 6 may approximate or match the taper angle of the elongate stem 26 of an implant 20 of the kind shown in FIG. 1, to aid in shaping an internal taper of the intramedullary canal 70 to receive the implant 20. Once this reaming step has been performed, the surgical rotational driver may be disconnected from the distal part 10, while leaving the distal part inside the intramedullary canal 60.

In a next step, the proximal part 30 may be coupled to a surgical rotational driver (which may or may not be same driver as that used to rotate the distal part 10 in the initial reaming step described above) and coupled to the distal part 10 by feeding the proximal part into the intramedullary canal so that the proximal end 2 is received within the cavity 50. Torque may then be applied to the proximal part 30 to ream bone from the femur 60 (or humerus in the case of shoulder surgery) while the surgeon manipulates the proximal part 30. These manipulations may include or more of:

moving the proximal part along a direction parallel to the rotational axis 14 of the distal part 10, to change the vertical position of the proximal part 30 within the femur 60 (or humerus in the case of shoulder surgery) as represented in FIG. 7 by the arrow labelled H;

tilting the proximal part 30 in one or more directions, so that the rotational axis 44 of the proximal part 30 tilts with respect to the rotational axis 14 of the distal part 10; and precessing the proximal part 30 around the rotational axis 14 of the distal part 10 as indicated by the arrow labelled K in FIG. 7 (the arrow labelled J in FIG. 7 represents the rotation of the proximal part 30 around its own rotational axis 44)

In some embodiments, the parts of the cutting surface 36 located near the shoulder 38 of the proximal part of the proximal part 30 may be used for reaming away a surface 66 of the greater trochanter 62 of the femur 60 (or humerus in the case of shoulder surgery) as illustrated in FIG. 7. The shoulder 38 may aid in retrograde reaming of the greater trochanter. For instance, the shoulder 36 may have a profile which approximates or matches a profile of the shoulder 24 of an implant 20 of the kind shown in FIG. 1, to aid in preparing the surface of the bone to receive the implant 20. The inner surface (e.g. sidewall 52 of the cavity 50 may be shaped so that the maximum tilt angle of the proximal part 30 relative to the distal part 10 prohibits over-reaming of, for instance, the greater trochanter 62 while performing this step.

Once the reaming has been completed, the proximal part 30 may be decoupled from the distal part 10 by withdrawing the proximal part from the femur 60 (or humerus in the case of shoulder surgery). The distal part 10 may then also be removed from the femur 60 (or humerus in the case of shoulder surgery) and the procedure may proceed to the insertion of the implant within the femur 60 (or humerus in the case of shoulder surgery).

Returning to FIG. 5, in some embodiments, the distal end 34 of the proximal part 30 may be provided with a chamfered portion 35. This chamfered portion 35 may taper outwardly such that the diameter of the distal shaft portion 36 increases from the opening of the cavity to the diameter $\phi B_3$ as one moves proximally along the distal shaft portion 36 from the distal end 34. The chamfered portion 35 can aid in the tilting of the proximal part 30 with respect to the distal part 10. The taper angle of the chamfered portion 35 (measured between the surface of the chamfered portion 35 and the plane perpendicular to the rotational axis 44) may, for instance, be substantially equal to, or greater than, the angle G, to allow the maximum tilt of the proximal part 30 to be reached, without the surface of the chamfered portion 35 of the distal end 34 contacting the proximal shoulder 8 of the distal part 10. This can prevent inadvertent movement of the proximal part 30 along the rotational axis 14 of the distal part 10 owing to the riding of the distal end 34 of the proximal part 30 on the proximal shoulder 8 of the distal part 10 while the proximal part 30 is being tilted.

A surgical reamer of the kind described herein may be included in a surgical kit.

Accordingly, there has been described a surgical reamer and a method of reaming a bone using a surgical reamer. The reamer has a distal part comprising a proximal end coupleable to a surgical rotational driver; a distal end; a rotational axis extending between the proximal end and the distal end; and a cutting surface located between the proximal end and the distal end. The reamer also has a proximal part comprising a proximal end coupleable to a surgical rotational driver; a distal end; a rotational axis extending between the proximal end and the distal end; a cutting surface located between the proximal end and the distal end; and a cavity extending proximally from the distal end for receiving the proximal end of the distal part. An inner surface of the cavity is shaped to allow the proximal part to be tilted with respect to the distal part during rotation of the proximal part.

Although particular embodiments of this disclosure have been described, it will be appreciated that many modifications/additions and/or substitutions may be made within the scope of the claims.

The invention claimed is:

1. A surgical reamer comprising:
    a distal part comprising (i) a proximal end coupleable to a surgical rotational driver for applying torque to the distal part; (ii) a distal end; (iii) a rotational axis extending between the proximal end of the distal part and the distal end of the distal part; and (iv) a cutting surface located between the proximal end of the distal part and the distal end of the distal part; and
    a proximal part comprising (i) a proximal end coupleable to a surgical rotational driver for applying torque to the proximal part; (ii) a distal end; (iii) a rotational axis extending between the proximal end of the proximal part and the distal end of the proximal part; (iv) a cutting surface located between the proximal end of the proximal part and the distal end of the proximal part; and (v) a cavity extending proximally from the distal end of the proximal part for receiving the proximal end of the distal part, wherein (a) an inner surface of the cavity is shaped to allow the rotational axis of the proximal part to be tilted with respect to the rotational axis of the distal part during rotation of the proximal part about the rotational axis of the proximal part with the proximal end of the distal part received within said cavity, and (b) the cavity is frustum shaped, with a narrow end of the frustum shaped cavity being located at the distal end of the proximal part, and a wide end of the frustum shaped cavity being located proximally with respect to the distal end of the proximal part.

2. The surgical reamer of claim 1, wherein the cavity is shaped to allow the rotational axis of the proximal part to be tilted in a plurality of directions with respect to the rotational axis of the distal part during rotation of the proximal part about the rotational axis of the proximal part with the proximal end of the distal part received within said cavity.

3. The surgical reamer of claim 2, wherein the cavity is shaped to allow the rotational axis of the proximal part to be tilted for precession of the rotational axis of the proximal part about the rotational axis of the distal part during rotation of the proximal part about the rotational axis of the proximal part with the proximal end of the distal part received within said cavity.

4. The surgical reamer of claim 1, wherein the cavity is shaped to allow the rotational axis of the proximal part to be tilted with respect to the rotational axis of the distal part during rotation of the proximal part about the rotational axis of the proximal part with the proximal end of the distal part received within said cavity by an angle $\theta$ in the range $0° \leq \theta \leq 25°$.

5. The surgical reamer of claim 1, wherein a cross section of the frustum shaped cavity in a plane perpendicular to the rotational axis of the proximal part is substantially circular.

6. The surgical reamer of claim 1, wherein the proximal end of the distal part is slideably insertable and removable from said cavity.

7. The surgical reamer of claim 1, wherein the proximal end of the distal part comprises a connection feature for coupling to the surgical rotational driver, and wherein the cavity has a depth equal to or greater than a length of said connection feature, for completely receiving the connection feature within the cavity.

8. The surgical reamer of claim 1, wherein the distal end of the proximal part comprises a chamfer to facilitate tilting of the proximal part with respect to the distal part.

9. The surgical reamer of claim 8, wherein a chamfer angle of said chamfer with respect to a plane perpendicular to the rotational axis of the proximal part is substantially equal to or greater than a maximum value of a tilt angle $\theta$ allowed by the shape of said cavity.

10. The surgical reamer of claim 1, wherein the cutting surface of the proximal part extends between the distal end of the proximal part and a cutting shoulder located intermediate the distal end of the proximal part and the proximal end of the proximal part.

11. The surgical reamer of claim 1, wherein the cutting surface of the proximal part is formed on a distal shaft portion of the proximal part, and wherein the distal shaft portion is tapered to have a wider diameter at a distal end of the distal shaft portion than at a proximal end of the distal shaft portion.

12. The surgical reamer of claim 10, wherein a widest diameter of the cutting surface of the proximal part at the distal end of the proximal part is substantially equal to a widest diameter of the cutting surface of the distal part.

13. The surgical reamer of claim 1, wherein:
    the distal part is elongate for reaming an inner surface of an intramedullary canal of a femur, and wherein the proximal part is elongate for reaming an inner surface of a greater trochanter of the femur; or
    the distal part is elongate for reaming an inner surface of an intramedullary canal of a humerus, and wherein the proximal part is elongate for reaming an inner surface of a greater trochanter of the humerus.

* * * * *